United States Patent [19]
Nakanishi

[11] Patent Number: 5,791,993
[45] Date of Patent: Aug. 11, 1998

[54] COMMUNICATION SYSTEM AND RELAY THEREOF

[75] Inventor: Kenichi Nakanishi, Tokyo, Japan

[73] Assignee: Sony Corporation, Tokyo, Japan

[21] Appl. No.: 590,886

[22] Filed: Jan. 24, 1996

[30] Foreign Application Priority Data

Jan. 31, 1995  [JP]  Japan .................................. 7-036117

[51] Int. Cl.$^6$ ..................................................... A63F 9/24
[52] U.S. Cl. ........................................... 463/42; 375/356
[58] Field of Search .................................. 463/40, 41, 42, 463/43; 395/306, 309; 375/356; 455/39, 49.1, 51.1

[56] References Cited

U.S. PATENT DOCUMENTS

| | | | |
|---|---|---|---|
| 4,588,187 | 5/1986 | Dell | 273/1 |
| 4,864,496 | 9/1989 | Triolo et al. | 395/306 |
| 5,301,275 | 4/1994 | Vanbuskirk | 395/250 |
| 5,416,808 | 5/1995 | Witsaman et al. | 375/356 |

FOREIGN PATENT DOCUMENTS 9102312  2/1991  WIPO .................. G06F 13/12

*Primary Examiner*—George Manuel
*Attorney, Agent, or Firm*—Jay H. Maioli

[57] ABSTRACT

A communication system for performing communications via a relay between a host apparatus and a plurality of terminals whose communication speed is lower than that of the host apparatus. In this system, data from a partial terminal is transmitted at a low speed in real time to the host apparatus during a partial period, while data from the other terminals is stored in the relay during the same period, and thereafter the data stored in the relay during the preceding period is transmitted at a high speed to the host apparatus, thereby shortening the restriction time of the host apparatus in regard to the communication. And in the low-speed real-time transmission of data from a partial terminal to the host apparatus, transfer clock signals supplied from the host apparatus to the relay can be used directly by the partial terminal and for storing, in the relay, the data transferred thereto from the other terminals, whereby any independent timing generator circuit need not be incorporated in the relay, and thus the relay can be structurally simplified with another advantage of reduced production cost.

21 Claims, 11 Drawing Sheets

COMMUNICATION SYSTEM AND RELAY THEREOF

BACKGROUND OF THE INVENTION

The present invention relates to a communication system and a relay thereof for performing communication via such a relay between a host apparatus and a plurality of terminals.

In a communication system where communication is performed between a host apparatus and a plurality of terminals via a relay, there sometimes exists a case that the communication speed of the terminals is lower than that of the host apparatus.

For example, a conventional game machine system for home use is generally so constituted that a terminal is connected directly to a game machine and communication is performed therebetween. In contrast with such a known system, there has recently been contrived a novel system where a relay is connected to a game machine and a plurality of terminals are rendered connectable to the relay simultaneously to realize communication between the game machine, which serves as a host apparatus, and the plurality of terminals via the relay, whereby a game can be played simultaneously by a plurality of users. And currently such a novel system is commercially available. However, there exists a case that, for reasons of reducing the production cost of the terminals and so forth, the communication speed of the terminals is sometimes lower than that of the game machine serving as a host apparatus.

In performing communication via a relay between a host apparatus and a plurality of terminals whose communication speed is lower than that of the host apparatus, it has been customary heretofore to adopt one of the following two methods.

In the first method, a real-time communication is performed initially, as indicated by an arrow 1a in FIG. 10A, between a host apparatus 3 and a first terminal 4 via a relay 2 at a low speed equal to the communication speed of the terminal 4, then a real-time communication is performed similarly at a low speed between the host apparatus 3 and a second terminal 5 via the relay 2 as indicated by an arrow 1b in FIG. 10B, and subsequently a real-time communication is performed similarly at a low speed between the host apparatus 3 and a third terminal 6 via the relay 2 as indicated by an arrow 1c in FIG. 10C. In this manner, low-speed real-time communications are performed in succession between the host apparatus 3 and the plurality of terminals 4–6 respectively via the relay 2 during different periods of time.

Meanwhile in the second method, transfer of data from terminals to a host apparatus is performed initially as indicated by arrows 7a, 7b and 7c in FIG. 11A, wherein data from the terminals 4, 5 and 6 are transmitted simultaneously to a relay 2 at a low speed and, after storage of the data in the relay 2, the entire stored data are transmitted from the relay 2 to the host apparatus 3 at a high speed, as indicated by an arrow 8 in FIG. 11B.

As for transfer of the data from the host apparatus 3 to the terminals 4, 5 and 6, first the data to the respective terminals 4, 5 and 6 are transmitted at a high speed from the host apparatus 3 to the relay 2 and, after storage of the data in the relay 2, the data to the terminals 4, 5 and 6 thus stored in the relay 2 are transmitted therefrom simultaneously to the terminals 4, 5 and 6 at a low speed.

However, according to the first conventional communication method, there exists a disadvantage that the host apparatus 3 is restricted to communications for a long time since low-speed real-time communications are performed successively between the host apparatus 3 and the plural terminals 4–6 during different time periods.

Meanwhile according to the second conventional communication method, data transfer unconcerned with the host apparatus 3 is executed between each of the terminals 4–6 and the relay 2, so that it becomes necessary to incorporate an independent timing generator circuit in the relay 2 and to supply transfer clock signals to the terminals 4–6 respectively, whereby the relay 2 is structurally complicated with another disadvantage of high production cost.

SUMMARY OF THE INVENTION

It is therefore an object of the present invention to provide improvements in a communication system and a relay used therein where communication is performed via such a relay between a host apparatus and a plurality of terminals whose communication speed is lower than that of the host apparatus. According to the present invention, the restriction time of the host apparatus in regard to the communication can be shortened, and transfer clock signals supplied from the host apparatus to the relay can be used directly as those to the entire terminals, whereby it is rendered unnecessary to incorporate any independent timing generator circuit in the relay, hence simplifying the structure of the relay and reducing the production cost thereof.

According to one aspect of the present invention, there is provided an improved communication system for performing communication via a relay between a host apparatus and a plurality of terminals whose communication speed is lower than that of the host apparatus. In this communication system, data from a partial terminal is transmitted at a low speed in real time to the host apparatus, while data from the other terminals are stored in the relay during the same time period, and thereafter the data stored in the relay are transmitted at a high speed to the host apparatus.

According to another aspect of the present invention, there is provided an improved communication relay equipped with a plurality of buffer memories corresponding respectively to individual terminals connected to the relay, wherein data from a partial terminal is transmitted at a low speed in real time to a host apparatus connected to the relay, while data from the other terminals are stored in the buffer memories during the same time period, and thereafter the data stored in the buffer memories are transmitted at a high speed to the host apparatus.

In the communication system of the above constitution and the relay thereof, the data from a partial terminal is transmitted at a low speed in real time during a partial time period, and thereafter the data from the other terminals stored in the relay during the preceding time period are transmitted at a high speed to the host apparatus, thereby shortening the restriction time of the host apparatus in regard to the communication.

Furthermore, in low-speed real-time transmission of data from a partial terminal to the host apparatus, transfer clock signals supplied from the host apparatus to the relay can be used directly as those to the partial terminal while being also usable directly for storing, in the relay, the data transferred thereto from the other terminals, whereby any independent timing generator circuit need not be incorporated in the relay, and thus the relay can be structurally simplified with another advantage of reduced production cost.

The above and other features and advantages of the present invention will become apparent from the following description which will be given with reference to the illustrative accompanying drawings.

DESCRIPTION OF THE PREFERRED EMBODIMENTS

The communication system and the relay thereof according to the present invention will be described below as an exemplary home game machine system and a relay thereof for bidirectional serial communication performed among three terminals on the basis of 1-bit synchronous communication and 8-bit asynchronous communication.

Figure 1:
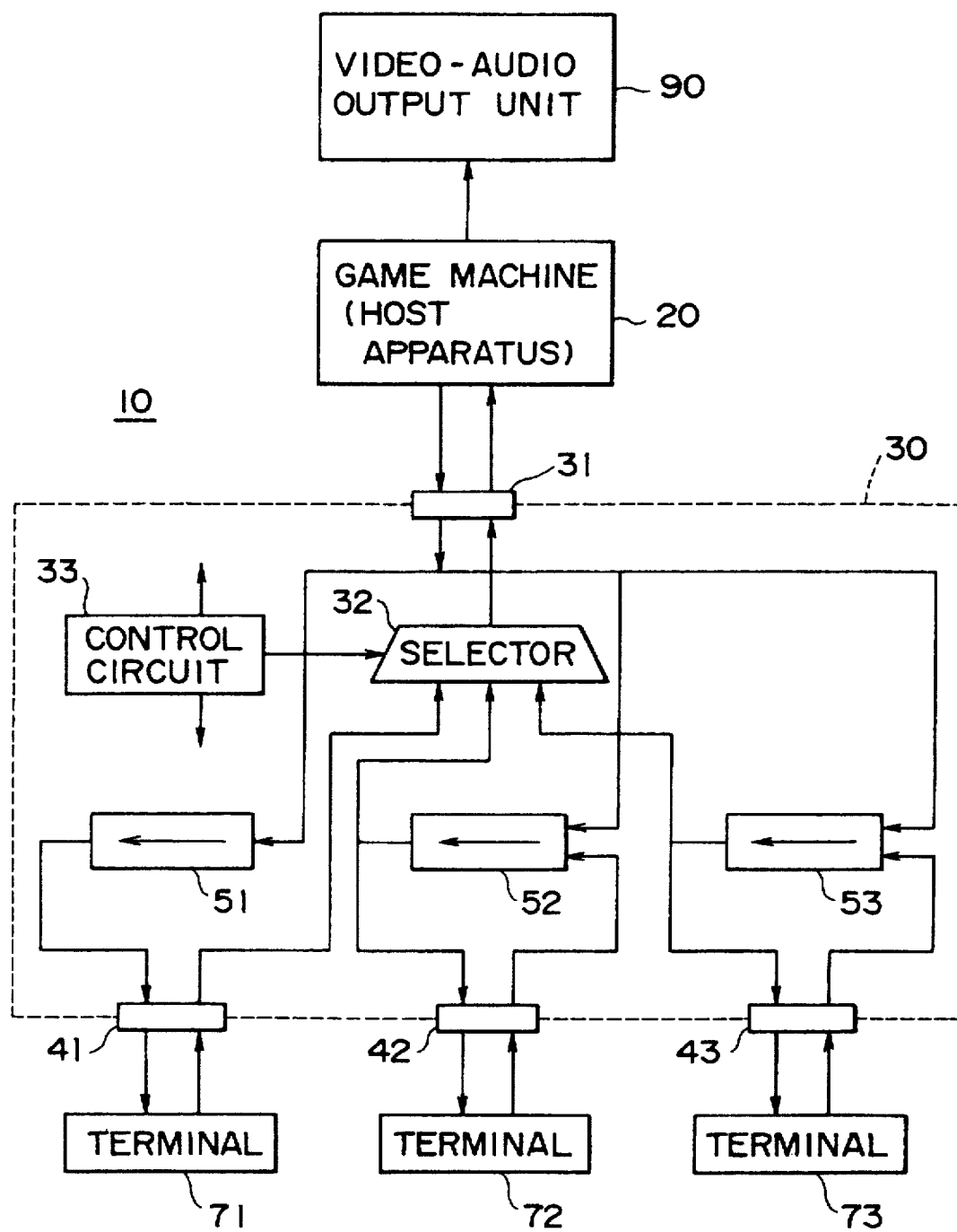
FIG. 1 is a functional block diagram of an exemplary embodiment which represents a communication system and a relay thereof according to the present invention.

FIG. 1 shows an exemplary game machine system and a relay thereof. In this embodiment, a game machine system 10 as a communication system is so constituted that a game machine 20 as a host apparatus is connected to a video-audio output unit 90 which produces a video-audio output as a result of its processing and indicates such an output for an operator, and a relay 30 is connected to the game machine 20, and further three terminals 71, 72 and 73 are connected to the relay 30.

The relay 30 comprises transceivers 31, 41, 42 and 43, FIFO buffers 51, 52 and 53 serving as buffer memories, a selector 32 and a control circuit 33.

The transceiver 31 receives data from the game machine 20 therethrough to the relay 30 by serial communication, or transmits data from the relay 30 therethrough to the game machine 20 by serial communication. Serial transfer clock signals are transmitted from the game machine 20 via the transceiver 31 to the relay 30.

The transceivers 41, 42 and 43 transmit the data from the relay 30 therethrough to the terminals 71, 72 and 73 respectively by serial communication in accordance with the transfer clock signals transmitted from the gate machine 20 to the relay 30 respectively, or receive the data from the terminals 71, 72 and 73 therethrough to the relay 30 by serial communication.

The FIFO buffers 51, 52 and 53 correspond respectively to the terminals 71, 72 and 73. The data from the game machine 20 is written in the FIFO buffer 51, and the data from the FIFO buffer 51 is transmitted to the terminal 71.

The data from the game machine 20 or the terminal 72 is written in the FIFO buffer 52, and the data from the FIFO buffer 52 is transmitted to the terminal 72 or the game machine 20. Similarly the data from the game machine 20 or the terminal 73 is written in the FIFO buffer 53, and the data from the FIFO buffer 53 is transmitted to the terminal 73 or the game machine 20.

The selector 32 successively selects the data from the terminal 71, the data from the FIFO buffer 52 and the data from the FIFO buffer 53 as will be described later, and then transmits the selected data via the transceiver 31 to the game machine 20.

The control circuit 33 generates a timing signal out of the transfer clock signal transmitted from the game machine 20 to the relay 30, and controls the transceivers 31, 41–43 by such a timing signal to switch the selector 32 in an undermentioned manner, thereby controlling the FIFO buffers 51–53.

Now the operation of the game machine system 10 having the above constitution will be described below with reference to FIGS. 2 to 9.

Figure 2:
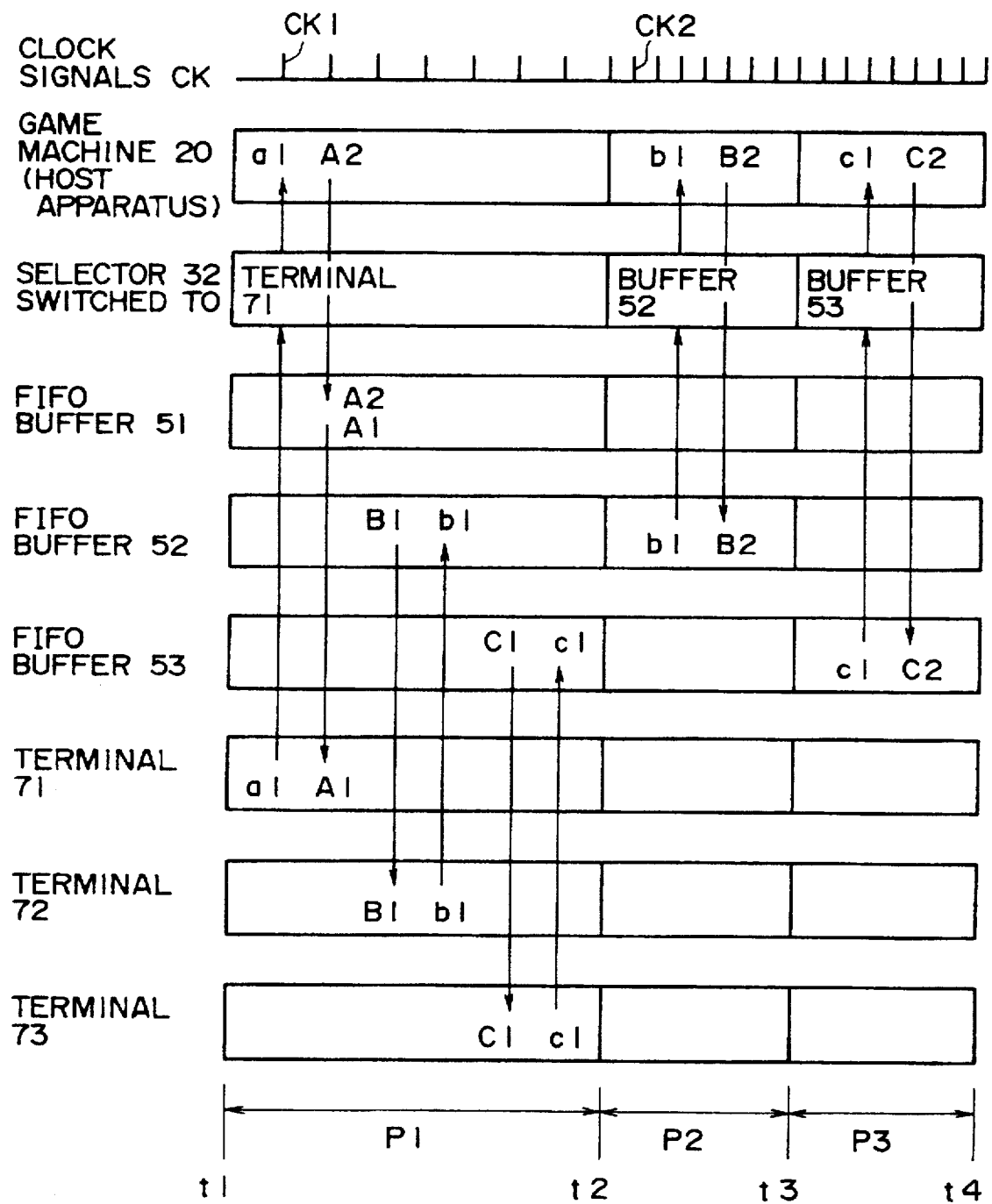
FIG. 2 is a timing chart of signals for explaining the operation performed in FIG. 1.
Figure 3:
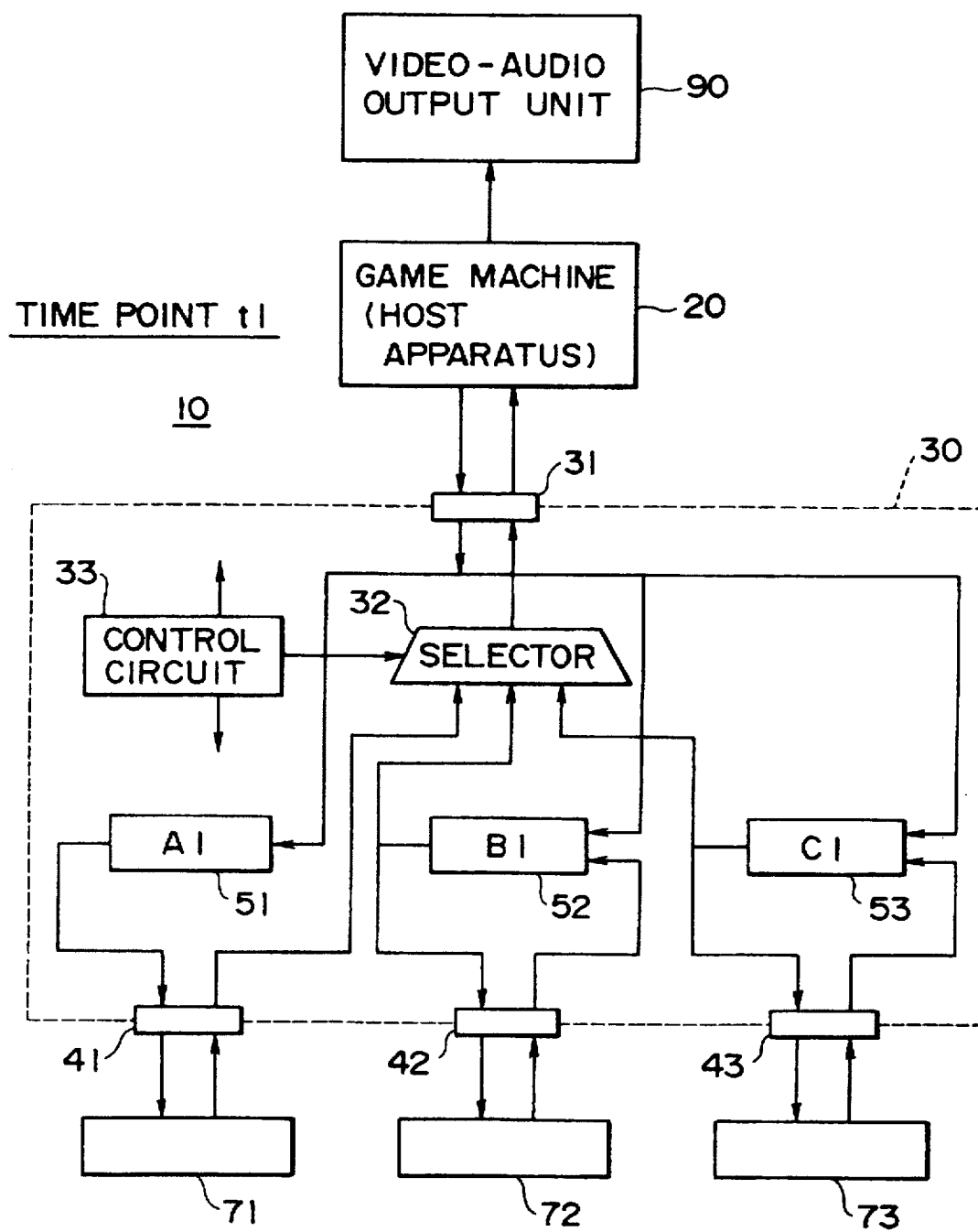
FIGS. 3 to 9 are diagrams for explaining the sequential operations in FIG. 1.

At a time point t1 in FIG. 2 posterior to repeated communications between the game machine 20 and the terminals 71–73 via the relay 30, the 1-byte data A1, B1 and C1 transmitted from the game machine 20 last time are stored in the FIFO buffers 51, 52 and 53 respectively, as shown in FIG. 3.

Subsequently to this state, a communication is performed between the game machine 20 and each of the terminals 71–73 via the relay 30 in the following three phases within one communication packet.

In the first phase during a period P1 shown in FIG. 2, low-rate data transfer is executed with transmission of data to each of the terminals 71–73.

Figure 4:
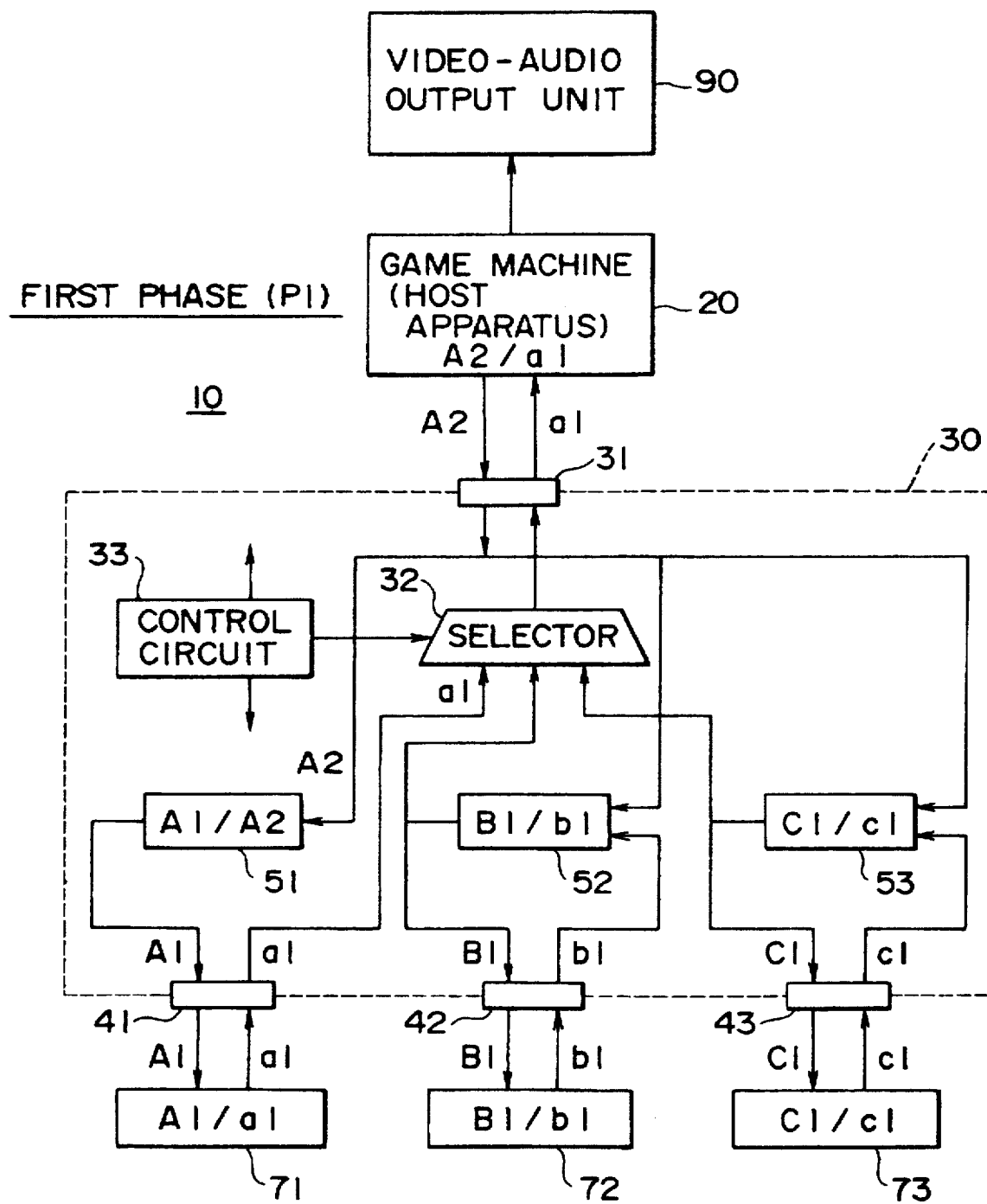

More specifically, during the period P1, the transfer clock signal CK from the game machine 20 is set to a low-rate clock signal CK1, an d the selector 32 in the relay 30 is switched to a state for selecting the data obtained from the terminal 71 so that, as shown in FIG. 4 also, the data a1 of the current communication from the terminal 71 is transmitted directly to the game machine 20 without being stored in the FIFO buffer 51.

And simultaneously the data A1 of the preceding communication stored in the FIFO buffer 51 is transmitted to the terminal 71, while the data A2 of the current communication from the game machine 20 is stored in the FIFO buffer 51.

Further simultaneously therewith, the data B1 and C1 of the preceding communications stored in the FIFO buffers 52 and 53 are transmitted to the terminals 72 and 73 respectively, and the data b1 and c1 of the current communications received from the terminals 72 and 73 are stored in the FIFO buffers 52 and 53 respectively.

Figure 5:
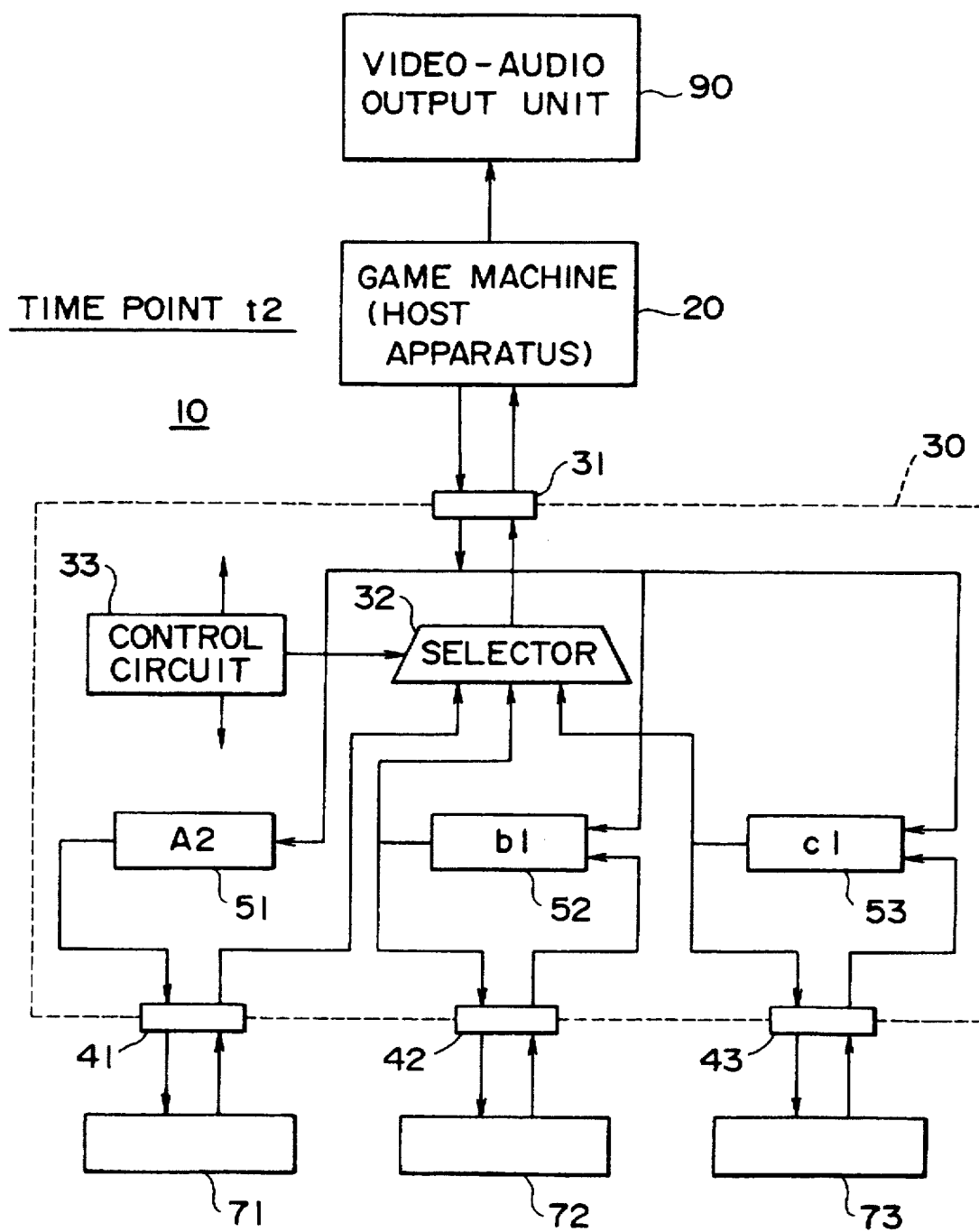

At a time point t2 in FIG. 2 corresponding to the end of the first phase, the 1-byte data A2 transmitted from the game machine 20 is stored in the FIFO buffer 51, while the 1-byte data b1 and c1 transmitted from the terminals 72 and 73 are stored in the terminals 72 and 73 respectively, as shown in FIG. 5.

In the second phase during a period P2 shown in FIG. 2, high-rate transfer of the data from the terminal 72 is executed from the relay 30 to the game machine 20.

Figure 6:
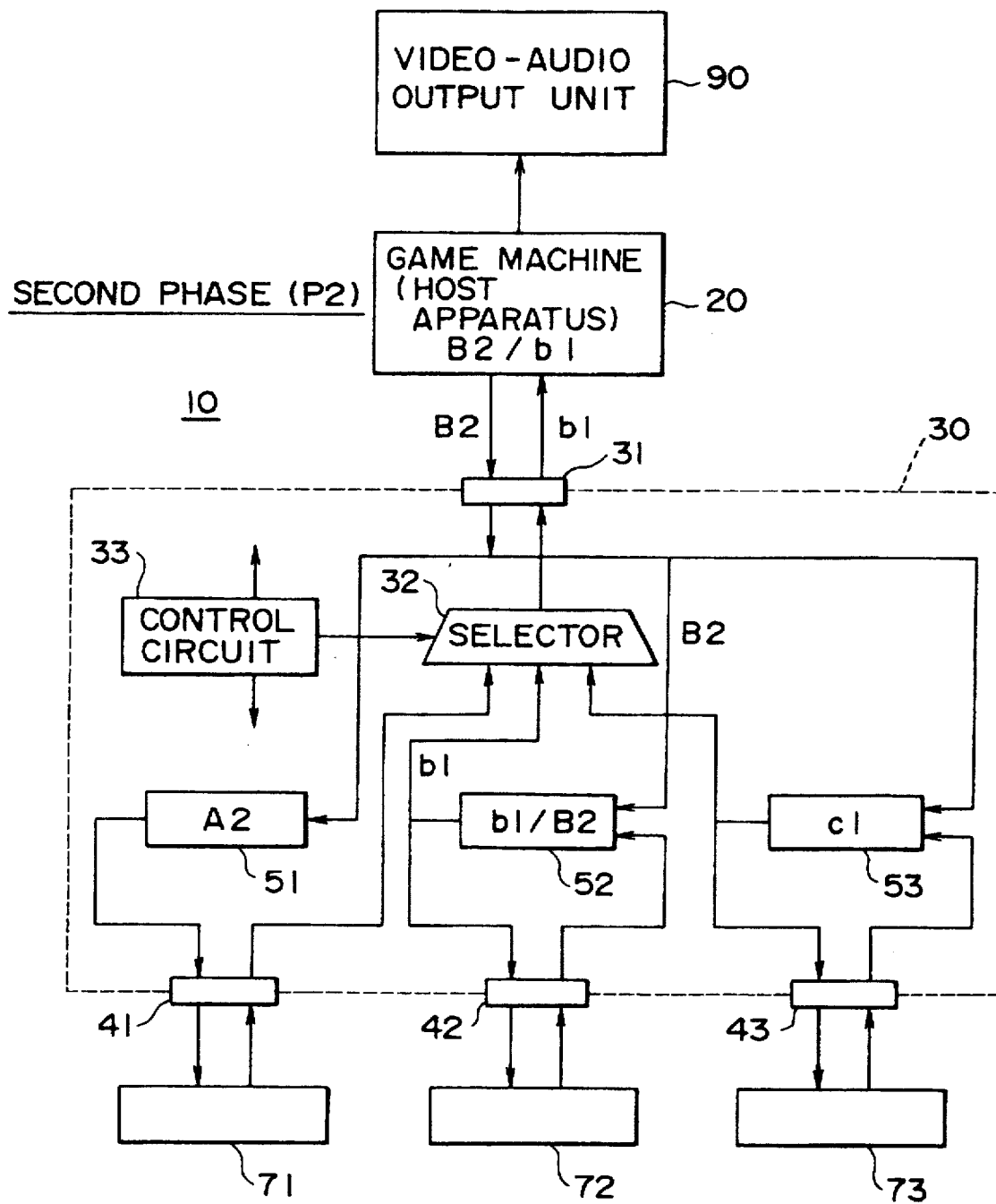

More specifically, during the period P2, the transfer clock signal CK from the game machine 20 is set to a high-rate clock signal CK2, and the selector 32 in the relay 30 is switched to a state for selecting the data obtained from the FIFO buffer 52 so that, as shown in FIG. 6 also, the data b1 from the terminal 72 stored in the FIFO buffer 52 in the first phase is transmitted to the game machine 20 from the FIFO buffer 52. And simultaneously the data B2 of the next communication from the game machine 20 is stored in the FIFO buffer 52.

Figure 7:
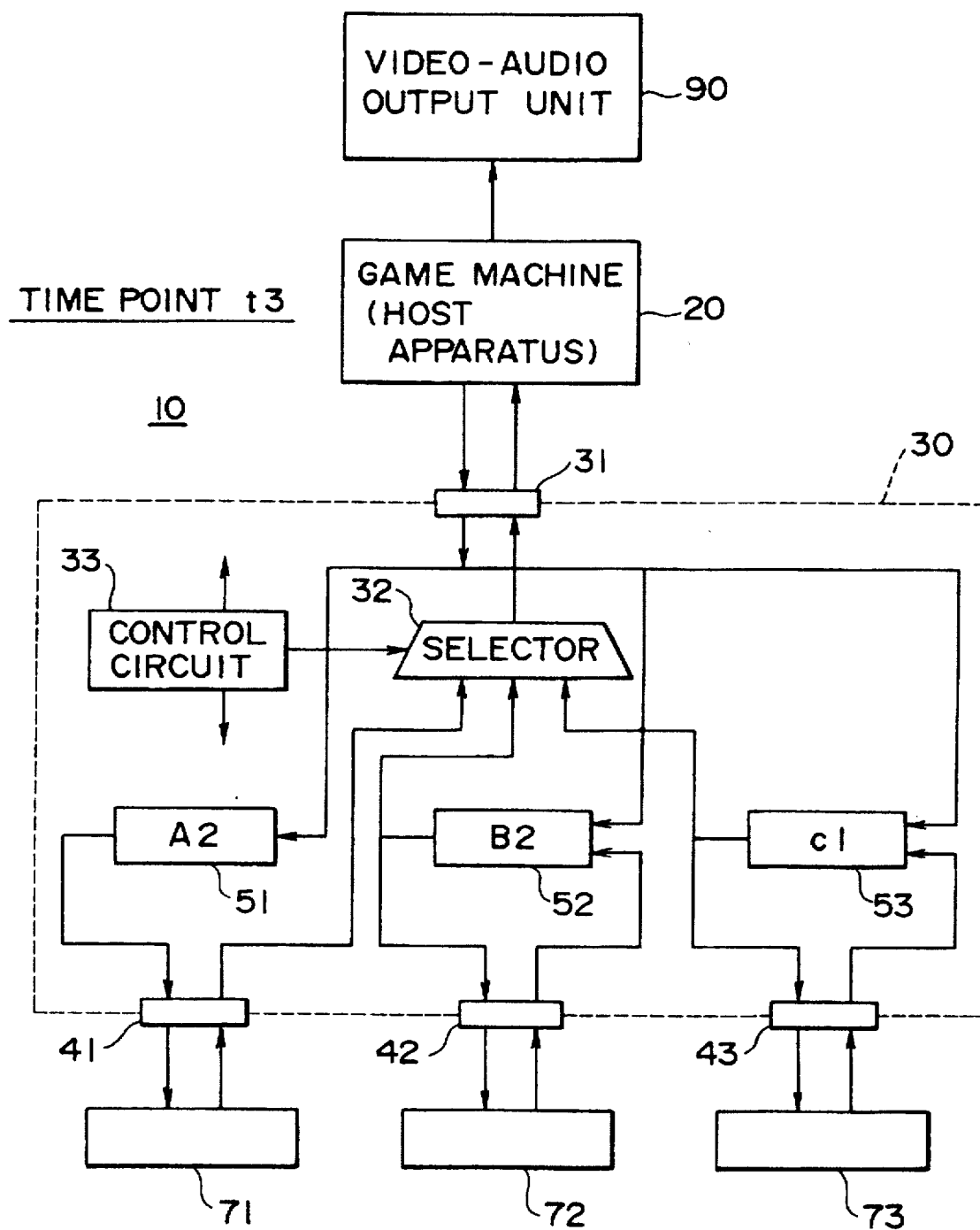

At a time point t3 in FIG. 2 corresponding to the end of the second phase, the 1-byte data A2 and B2 transmitted from the game machine 20 are stored in the FIFO buffers 51 and 52 respectively, while the 1-byte data c1 transmitted from the terminal 73 is stored in the FIFO buffer 53, as shown in FIG. 7.

In the third phase during a period P3 shown in FIG. 2, high-rate transfer of the data from the terminal 73 is executed from the relay 30 to the game machine 20.

Figure 8:
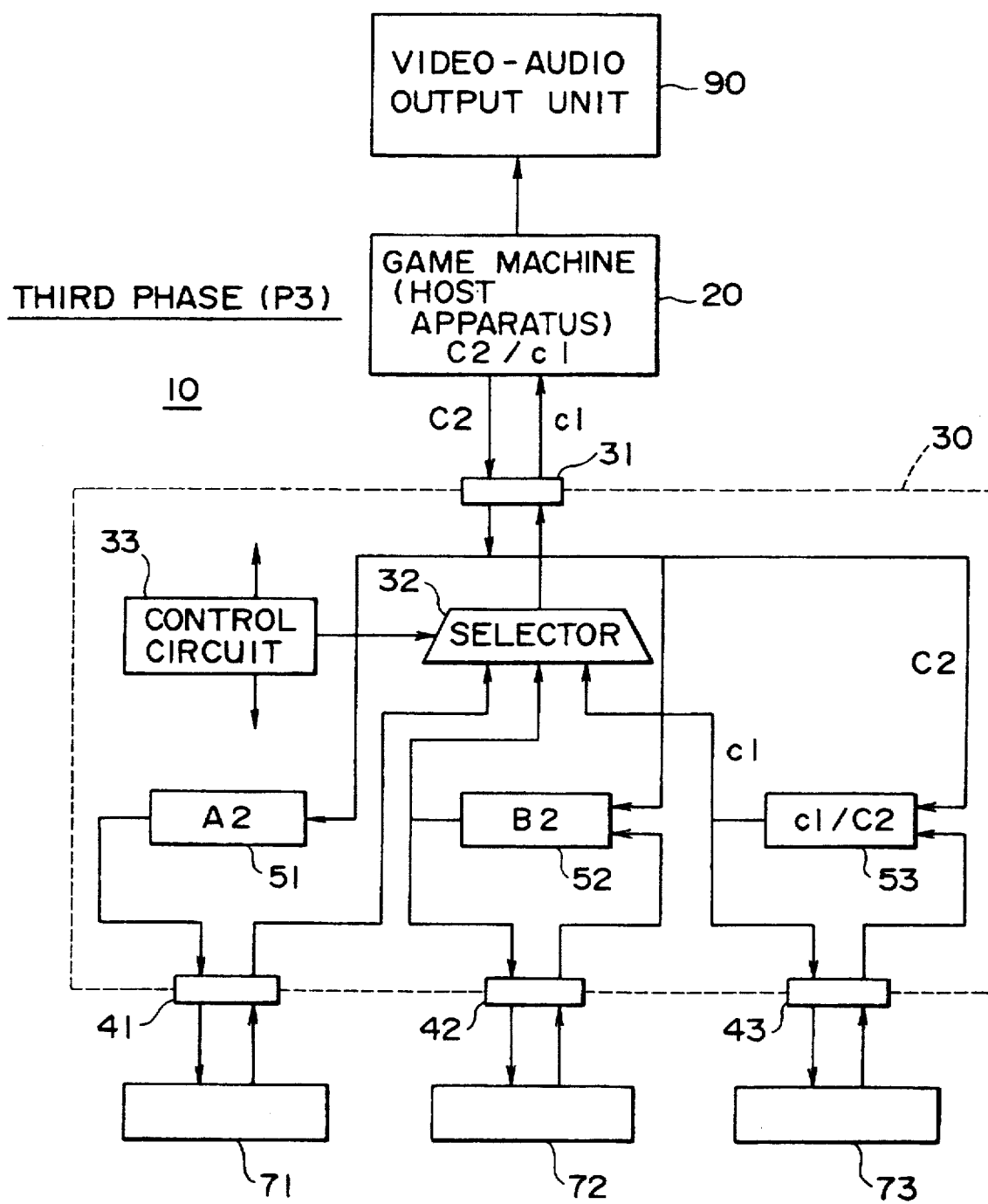

More specifically, during the period P3, the transfer clock signal CK from the game machine 20 is set to a high-rate clock signal CK2 as during the period P2, and the selector 32 in the relay 30 is switched to a state for selecting the data obtained from the FIFO buffer 53 so that, as shown in FIG. 8 also, the data c1 from the terminal 73 stored in the FIFO buffer 53 in the first phase is transmitted to the game machine 20 from the FIFO buffer 53. And simultaneously the data C2 of the next communication from the game machine 20 is stored in the FIFO buffer 53.

Figure 9:
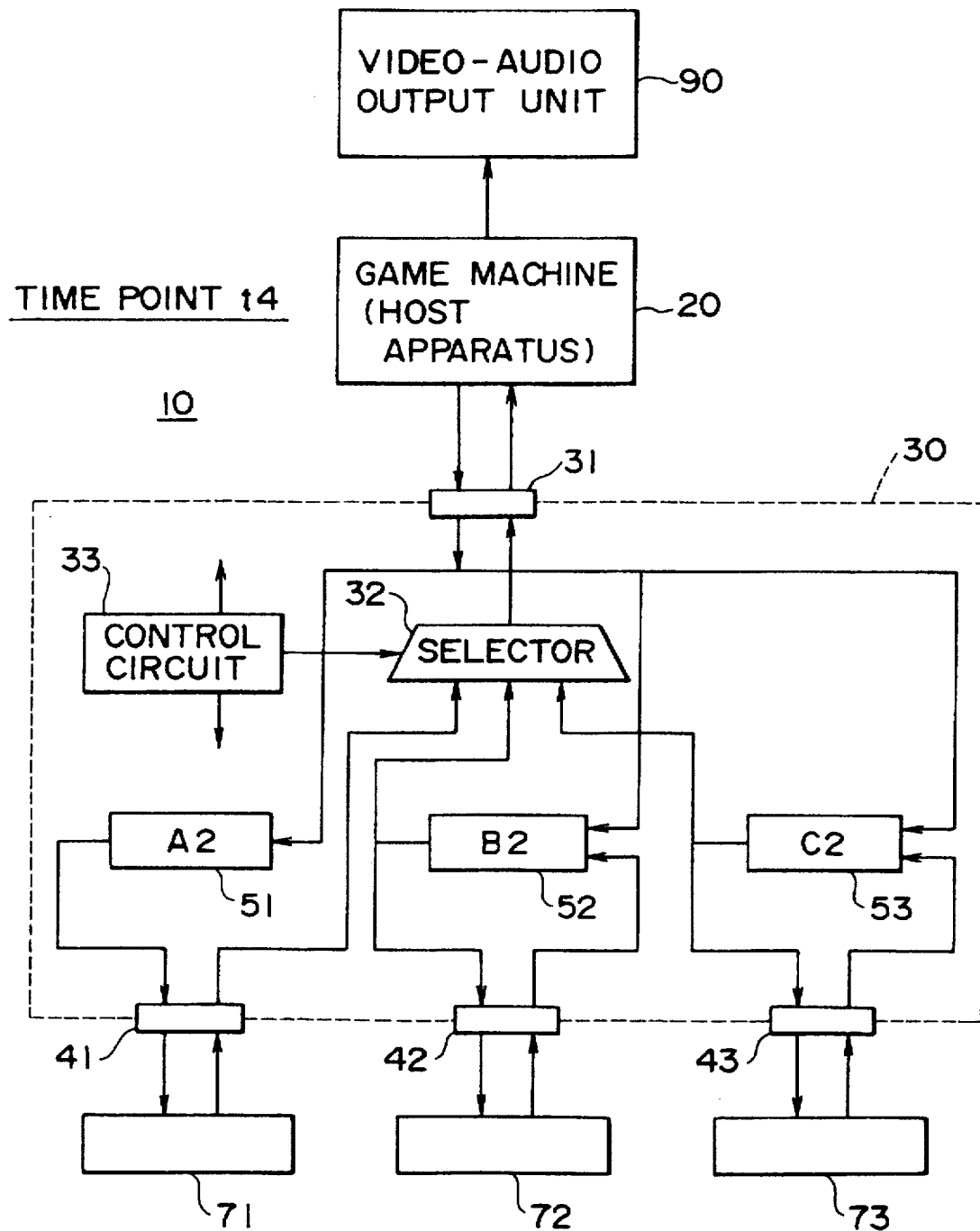
Figure 10A:
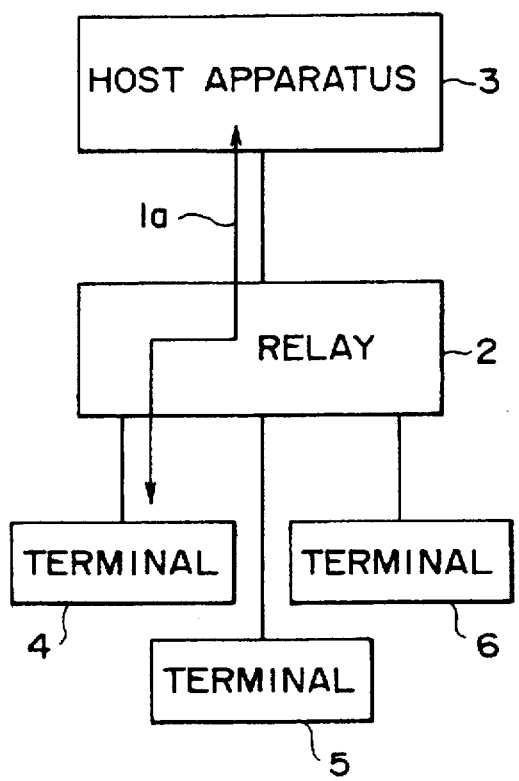
FIGS. 10A-C shows a conventional first communication method in the prior art.
Figure 10B:
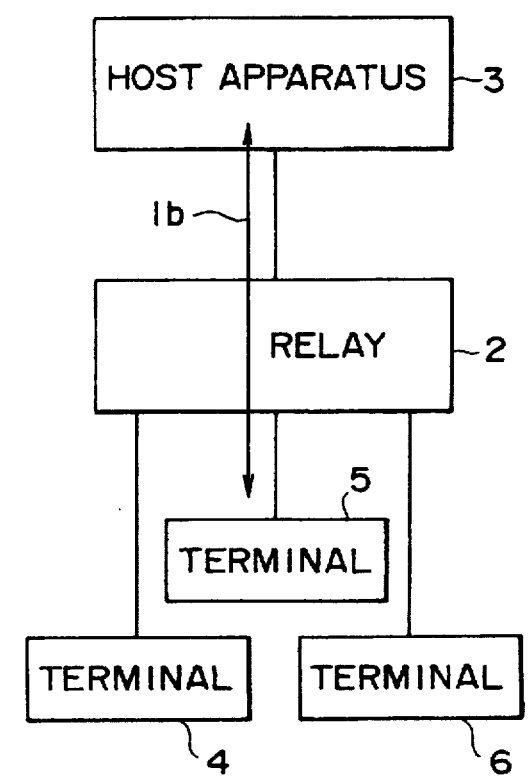
Figure 10C:
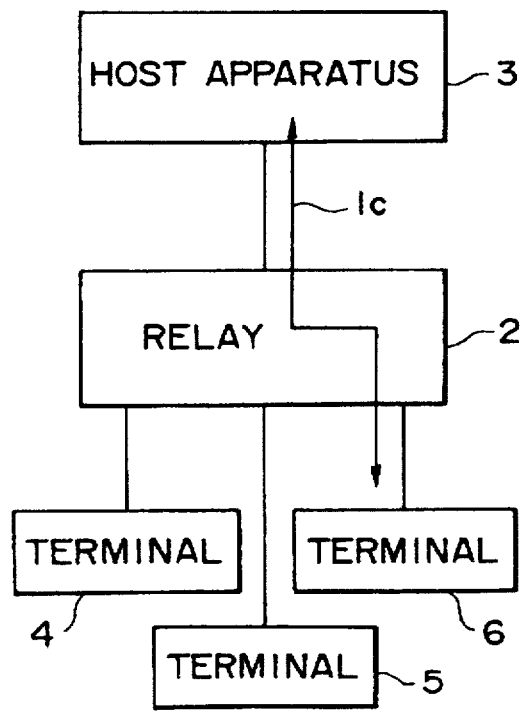
Figure 11A:
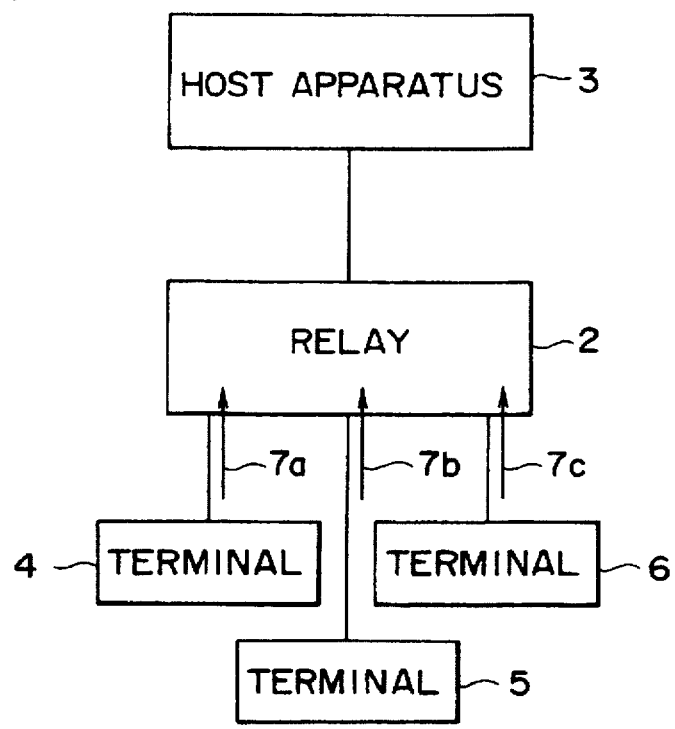
FIG. 11 shows a conventional second communication method in the prior art.
Figure 11B:
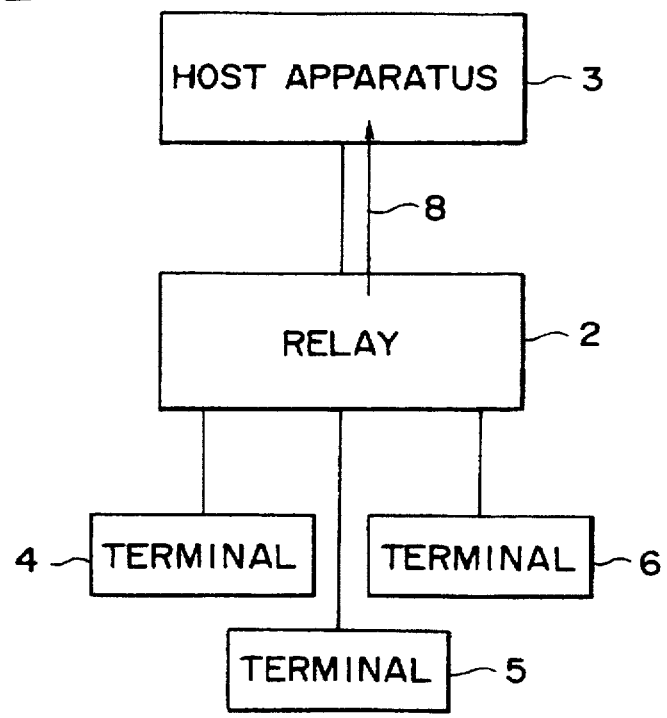

And at a time point t4 in FIG. 2 corresponding to the end of the third phase, the 1-byte data A2, B2 and C2 transmitted from the game machine 20 are stored in the FIFO buffers 51, 52 and 53 respectively, as shown in FIG. 9.

Thus, in the embodiment mentioned above, the data a1 from the terminal 71 is transmitted, during the period P1, to the game machine 20 at a low speed in real time, but during the succeeding periods P2 and P3 posterior to the period P1, the data b1 and c1 received from the terminals 72 an d 73 a nd stored respectively in the FIFO buffers 52 and 53 in the relay 30 during the period P1 are transmitted to the game machine 20 at a high speed, whereby the restriction time of the game machine 20 in regard to the communication can be shortened.

Further, in transmitting the data a1 from the terminal 71 to the game machine 20 at a low speed in real time, the transfer clock signal CK1 supplied from the game machine 20 to the relay 30 can be used directly as a clock signal for transfer of the data to the terminal 71, and the data b1 and c1 from the terminals 72 and 73 can be stored respectively in the FIFO buffers 52 and 53 by directly using the transfer clock signal CK1, whereby it is rendered unnecessary to incorporate any independent timing generator circuit or the like in the relay 30, hence simplifying the structure of the relay 30 and reducing the production cost thereof.

In addition, since the clock signal CK in the relay 30 is unifiable, the relay 30 can be designed with enhanced facility, and it is possible to attain complete coincidence in the timing to transmit the data a1, b1 and c1 from the entire terminals 71, 72 and 73 to the game machine 20.

The number of terminals connectable to the relay may be two, four or more. In an exemplary case where a maximum of four terminals are connectable to the relay, the system may be so constituted that, in the aforementioned first phase, the data of the preceding communication stored in the FIFO buffer for the fourth terminal is transmitted to the fourth terminal, and the data of the current communication from the fourth terminal is stored in the FIFO buffer for the fourth terminal; and in the fourth phase subsequent to the aforementioned third phase, the data received from the fourth terminal in the first phase and stored in the FIFO buffer for the fourth terminal is transmitted to the game machine from the FIFO buffer for the fourth terminal, and the data of the next communication received from the game machine is stored in the FIFO buffer for the fourth terminal.

It is to be further noted that the application of the present invention is not limited merely to a home game machine system and a relay thereof alone, and the invention is widely applicable also to any communication system and a relay thereof where communication is performed between a host apparatus and a plurality of terminals via the relay.

According to the present invention, as described hereinabove, the restriction time of the host apparatus in regard to communication can be shortened, and it is unnecessary to incorporate any independent timing generator circuit or the like in the relay, hence simplifying the structure of the relay and reducing the production cost thereof.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

What is claimed is:

1. A communication relay for communicating between a host apparatus and a plurality of terminals, said host apparatus producing first and second clock signals, said communications relay comprising:

a transceiver for transmitting data to a host apparatus or receiving data from said host apparatus in accordance with one of said first and second clock signals produced by said host apparatus; and transmission means for sequentially transmitting via said transceiver output data from at least one of said plurality of terminals to said host apparatus using said first clock signal, and output data from remaining ones of said plurality of terminals to said host apparatus using said second clock signal, wherein said second clock signal is faster than said first clock signal.

2. The communication relay according to claim 1, wherein said transceiver is connected to said host apparatus by a serial communication link.

3. The communication relay according to claim 2, further comprising storage means for temporarily storing the output data transmitted from said remaining ones of said plurality of terminals.

4. The communication relay according to claim 3, wherein said storage means is comprised of FIFO memories.

5. The communication relay according to claim 3, wherein said transmission means transmits the output data of at least one of said plurality of terminals directly to said transceiver, temporarily stores the output data of said remaining of said plurality of terminals in said storage means, reads out the stored data, and transmits said stored data to said transceiver.

6. The communication relay according to claim 5, wherein said storage means further serves to temporarily store an output data from said transceiver to said plurality of terminals.

7. The communication relay according to claim 6, wherein the data between said storage means and said plurality of terminals is transferred in accordance with said first clock signal.

8. The communication relay according to claim 5, wherein said storage means is comprised of a plurality of memories corresponding to said plurality of terminals.

9. The communications relay according to claim 1, wherein said at least one of said plurality of terminals using said first clock signal is limited to one.

10. A game system comprising:

a game machine for producing first and second clock signals, wherein said second clock signal is faster than said first clock signal;

a plurality of terminals; and a relay for communicating between said game machine and said plurality of terminals, and for sequentially transmitting output data from at least one of said plurality of terminals to said game machine using said first clock signal, and transmitting output data from remaining ones of said plurality of terminals to said game machine using said second clock signal.

11. The game system according to claim 10, wherein said relay is connected to said game machine by a serial communication link.

12. The game system according to claim 11, wherein said relay further comprises storage means for temporarily storing the output data transmitted from the remaining ones of said plurality of terminals.

13. The game system according to claim 12, wherein said storage means is comprised of FIFO memories.

14. The game system according to claim 12, wherein the output data of at least one of said plurality of terminals is transmitted directly to said game machine, while the output data of the remaining ones of said plurality of terminals is read out from said storage means and later transmitted to said game machine.

15. The game system according to claim 14, wherein said storage means further serves to temporarily store an output data from said game machine to said plurality of terminals.

16. The game system according to claim 15, wherein the data between said storage means and said plurality of terminals is transferred in accordance with said first clock signal.

17. The game system according to claim 14, wherein said storage means is comprised of a plurality of memories corresponding to said plurality of terminals.

18. The game system according to claim 10, wherein said at least one of said plurality of terminals using said first clock signals is limited to one.

19. A communication method for use in a game system including a host apparatus, a plurality of connected terminals, and a communication relay for communicating between said host apparatus and said plurality of connected terminals, said method comprising the steps of:

transmitting output data from one of said plurality of connected terminals to said host apparatus using a first clock signal generated by said host apparatus;

transmitting output data from remaining ones of said plurality of connected terminals to said host apparatus using a second clock signal generated by said host apparatus; and selecting said second clock signal to be faster than said first clock signal.

20. The communication method according to claim 19, further comprising the steps of:

temporarily storing the output data from remaining ones of said plurality of connected terminals; and transmitting said stored data to said host apparatus using with said second clock signal.

21. The communication method according to claim 20, further comprising the steps of:

temporarily storing output data from said host apparatus to said plurality of connected terminals; and transmitting said stored data to said plurality of connected terminals using said first clock signal.

* * * * *